United States Patent
Shikimachi

(10) Patent No.: US 9,372,832 B2
(45) Date of Patent: Jun. 21, 2016

(54) ROAD INFORMATION PROVIDING APPARATUS

(71) Applicant: DENSO CORPORATION, Kariya, Aichi-pref. (JP)

(72) Inventor: Takeshi Shikimachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 120 days.

(21) Appl. No.: 13/763,748

(22) Filed: Feb. 11, 2013

(65) Prior Publication Data

US 2013/0218367 A1 Aug. 22, 2013

(30) Foreign Application Priority Data

Feb. 17, 2012 (JP) .................................. 2012-032721

(51) Int. Cl.
| | | |
|---|---|---|
| G06F 17/00 | (2006.01) | |
| G01C 21/36 | (2006.01) | |
| B60W 50/00 | (2006.01) | |
| B60W 40/10 | (2012.01) | |

(52) U.S. Cl.
CPC .............. *G06F 17/00* (2013.01); *B60W 40/10* (2013.01); *B60W 50/0097* (2013.01); *G01C 21/3658* (2013.01); *B60W 2550/402* (2013.01); *Y02T 10/84* (2013.01)

(58) Field of Classification Search
CPC .......................... B60W 2550/402; G06F 17/00
USPC ........... 340/988; 701/23, 428, 1, 119; 73/718, 73/718 R
See application file for complete search history.

(56) References Cited

U.S. PATENT DOCUMENTS

| | | | | |
|---|---|---|---|---|
| 5,661,650 | A | * | 8/1997 | Sekine .................... B62D 1/28 340/438 |
| 6,223,124 | B1 | | 4/2001 | Matsuno et al. |
| 6,249,742 | B1 | * | 6/2001 | Friederich ............. G01C 21/32 340/995.19 |
| 7,890,258 | B2 | * | 2/2011 | Endo .................. G01C 21/3492 701/423 |
| 8,892,583 | B2 | * | 11/2014 | Watanabe ............. G01C 21/32 707/758 |
| 2011/0191379 | A1 | * | 8/2011 | Watanabe ............ G09B 29/004 707/792 |

FOREIGN PATENT DOCUMENTS

| | | |
|---|---|---|
| JP | 09-016156 A | 1/1997 |
| JP | 3488319 B2 | 10/2003 |

* cited by examiner

*Primary Examiner* — Thomas G Black
*Assistant Examiner* — Ana Thomas
(74) *Attorney, Agent, or Firm* — Posz Law Group, PLC

(57) ABSTRACT

A road information providing apparatus includes a position detection unit, a matching unit, a reference point ranking unit, a calculation unit, a weighting unit, and a transmit unit. The position detection unit detects a present position of a vehicle. The matching unit specifies reference points based on the present position and map data. The reference point ranking unit defines a ranking of each reference point. The calculation unit calculates a priority value of each forward road link corresponding to one of the reference points. The weighting unit recalculates a weighted priority value of each forward road link based on the priority value of corresponding forward road link and the ranking of corresponding reference point. The transmit unit transmits the weighted priority value of each forward road link in order of increasing weighted priority value to an in-vehicle device.

11 Claims, 11 Drawing Sheets

FIG. 14

| REF POINT | R | C |
|---|---|---|
| 1 | 1 | 1 |
| 2 | 2 | 5 |
| 3 | 3 | 10 |

FIG. 15A

| LINK ID | P | C (C=1) | WP |
|---|---|---|---|
| 10001 | 1 | – | 1 |
| 10002 | 2 | – | 2 |
| 10003 | 3 | – | 3 |

FIG. 15B

| LINK ID | P | C (C=5) | WP |
|---|---|---|---|
| 20001 | 1 | – | 5 |
| 20002 | 2 | – | 10 |
| 20003 | 3 | – | 15 |

FIG. 15C

| LINK ID | P | C (C=10) | WP |
|---|---|---|---|
| 30001 | 1 | – | 10 |
| 30002 | 2 | – | 20 |
| 30003 | 3 | – | 30 |

FIG. 16
| LINK ID | P |
|---------|-----|
| 10001 | 1 |
| 10002 | 2 |
| 10003 | 3 |
| 20001 | 5 |
| 20002 | 10 |
| 30001 | 10 |
| 20003 | 15 |
| 30002 | 20 |
| 30003 | 30 |
FIG. 17
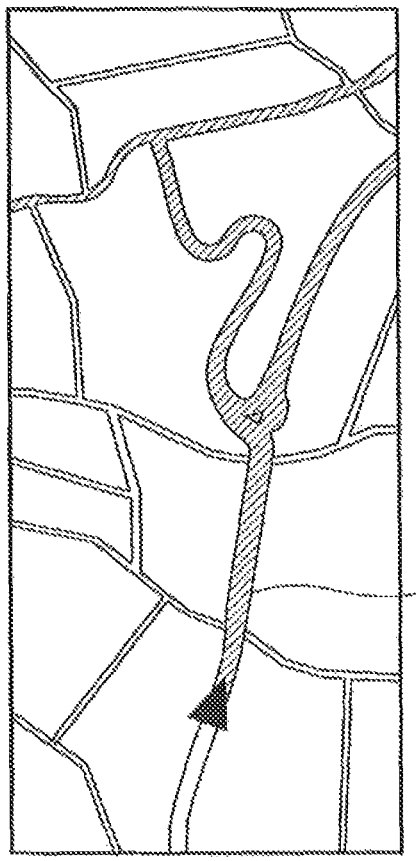
FIG. 18
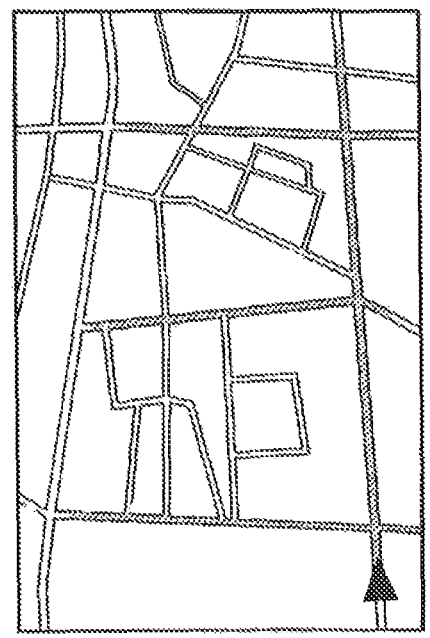

FIG. 19
FIG. 20
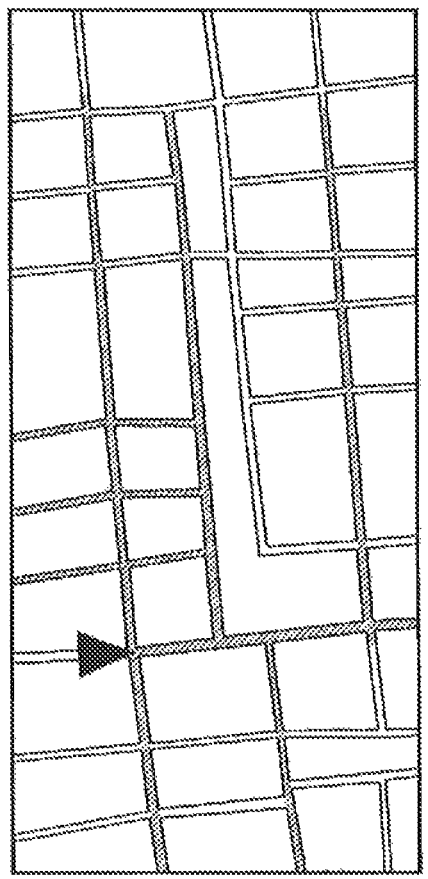
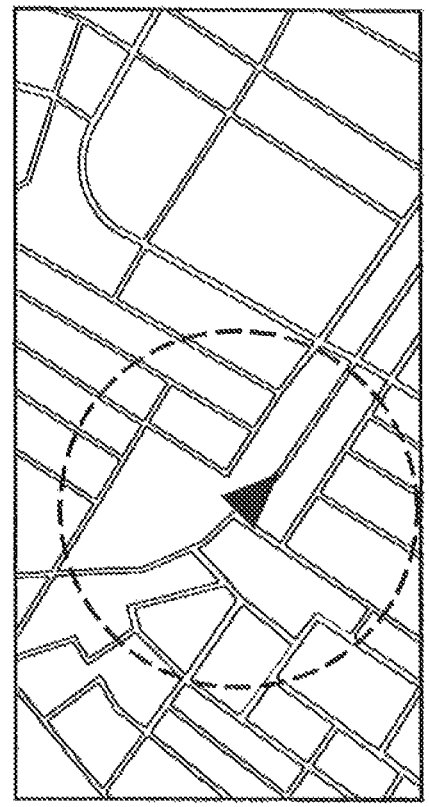

ROAD INFORMATION PROVIDING APPARATUS

CROSS REFERENCE TO RELATED APPLICATION

This application is based on Japanese Patent Application No. 2012-032721 filed on Feb. 17, 2012, the disclosure of which is incorporated herein by reference.

TECHNICAL FIELD

The present disclosure relates to a road information providing apparatus that provides road information of a road to be used by a vehicle to an in-vehicle device.

BACKGROUND

A drive support device, which operates based on map data, supports a driving safety by providing information of a forward road included in the map data. The information of the forward road is information of a road to be used by a vehicle. The drive support device provides a speed adjustment service that automatically reduces a speed of the vehicle when the vehicle runs a curved section of a road. The speed adjustment service is one of typical services provided by the drive support device.

The above-described speed adjustment service is executed only in a highway that has no junction. Recently, the speed adjustment service is also required to be applied to local roads, which have junctions.

When using information of the local roads included in the map data, a data amount of the information of the local roads, which is to be transmitted to the drive support device, is huge. When the drive support device supports a driving of the vehicle based on the map data, the drive support device needs to read information of the local roads to be used. However, it is impossible to absolutely predict the local roads to be used by the vehicle. Thus, the drive support device needs to consider information of all of the local roads that have the junctions.

Usually, a controller area network (CAN) is used for a data communication within the vehicle. The CAN has a limit to a data amount, which is also known as a communication band. Thus, the data amount of the road information to be transmitted to the drive support device is required to be reduced. Herein, the drive support device is a device placed in the vehicle to provide a drive support service.

A necessary service provided by the drive support device changes based on circumstances of surrounding roads. Thus, a map data obtaining scope and a map data obtaining method, which is also known as an algorithm, need to be changed based on the necessary service provided by the drive support device and an amount of the map data. The change of the map data obtaining scope and the map data obtaining method is required to be performed within the communication band of the CAN.

JR 3488319 B2 discloses a drive support device which uses road information of a scheduled route, which is calculated by a navigation device. However, a driver does not always select the scheduled route. Thus, only the road information of the scheduled route is not sufficient to support the driving of the vehicle.

SUMMARY

In view of the foregoing difficulties, it is an object of the present disclosure to provide a road information providing apparatus that reduces a data amount of road information to be transmitted to an in-vehicle device.

According to an aspect of the present disclosure, a road information providing apparatus includes a position detection unit, a matching unit, a reference point ranking unit, a calculation unit, a weighting unit, and a transmit unit. The position detection unit detects a present position of a vehicle to which the road information providing apparatus is equipped. The matching unit compares the present position of the vehicle with a map data, which include information of a map of a predetermined area, specifies a plurality of candidates of a subject position based on the present position and the map data, and sets the candidates of the subject position as a plurality of reference points. The subject position is a corresponding position of the present position on the map, and each of the reference points corresponds to a plurality of forward road links. The reference point ranking unit defines a ranking of each of the reference points. The calculation unit calculates a priority value of each of the forward road links. The weighting unit recalculates a weighted priority value of each of the forward road links based on the priority value of corresponding one of the forward road links and the ranking of corresponding one of the reference points. The transmit unit transmits the weighted priority, value of each of the forward road links in order of increasing weighted priority value to an in-vehicle device.

With the above apparatus, a data amount of forward road information to be transmitted to the in-vehicle device is reduced.

BRIEF DESCRIPTION OF THE DRAWINGS

The above and other objects, features and advantages of the present disclosure will become more apparent from the following detailed description made with reference to the accompanying drawings. In the drawings:

FIG. 14 is a table showing rankings of reference points and coefficients of reference points;

FIG. 15A, FIG. 15B, and FIG. 15C are diagrams respectively showing examples of setting weighted priority values to forward road links with respect to reference points;

FIG. 16 is a diagram showing rankings of forward road links, which are ranked in order of increasing priority value;

FIG. 17 is a diagram showing an example of a priority value setting area, which is defined for a priority value setting process, according to a modified embodiment of the present disclosure;

FIG. 18 is a diagram showing an example of a priority value setting area, which is defined for a priority value setting process, according to the modified embodiment of the present disclosure;

FIG. 19 is a diagram showing an example of a priority value setting area, which is defined for a priority value setting process, according to the modified embodiment of the present disclosure; and FIG. 20 is a diagram showing an example of a priority value setting area, which is defined for a priority value setting process, according to the modified embodiment of the present disclosure.

DETAILED DESCRIPTION

The following is premised that a road information providing apparatus 1 according to the following embodiments of the present disclosure is used in a left-hand traffic rule used in Japan or Great Britain. Further, without need to be limited thereto, the road information providing apparatus 1 according to the following embodiments can be used in a right-hand traffic rule used in the United States of America. In such a case, only the relation between the right and the left may be reversed.

Figure 1:
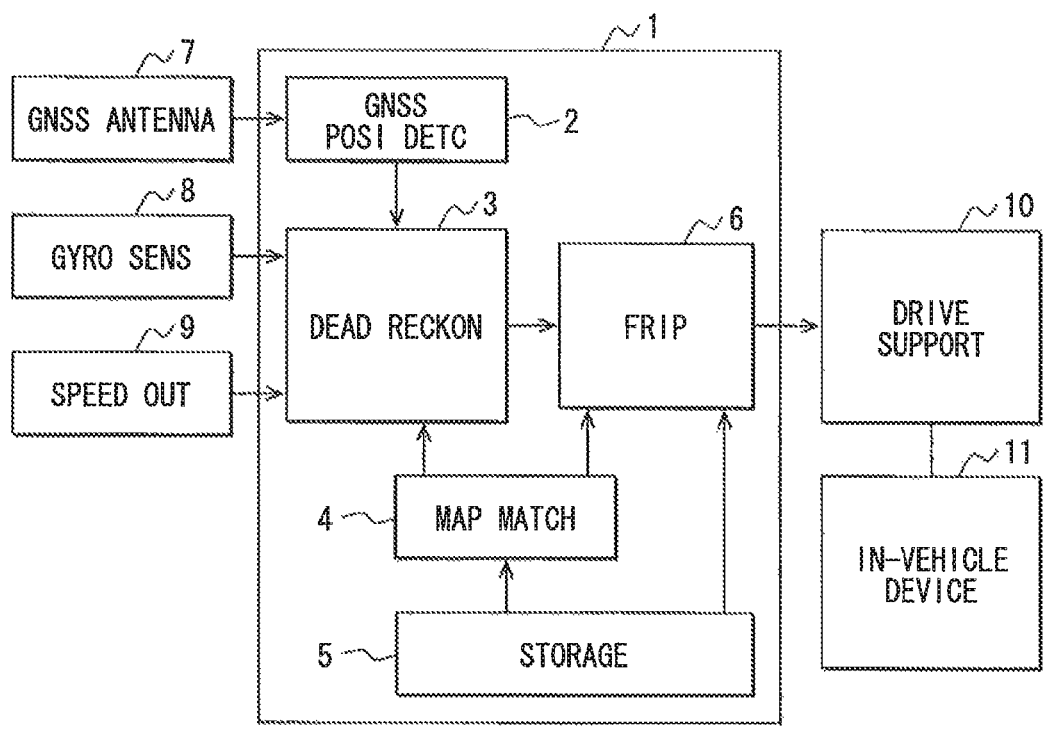
FIG. 1 is a block diagram showing a configuration of a road information providing apparatus according to a first embodiment of the present disclosure.

The following will describe a first embodiment of the present disclosure with reference to FIG. 1 to FIG. 16. As shown in FIG. 1, the road information providing apparatus 1, which is being placed in a vehicle, includes a position detection unit (POSI DETC) 2, a dead reckoning unit (DEAD RECKON) 3, a map matching unit (MAP MATCH) 4, a map data storage unit (STORAGE) 5, and a forward road information providing unit (FRIP) 6.

The position detection unit 2 detects a present position of the vehicle to which the road information providing apparatus 1 is equipped. Specifically, the position detection unit 2 receives global positioning system (GPS) signals with a global navigation satellite system (GNSS) antenna 7, and calculates coordinates of the present position based on the GPS signals. Thus, the position detection unit 2 is also referred to as a GNSS position detection unit (GNSS POSI DETC). The dead reckoning unit 3 prepares and stores a speed, an azimuth and a present traveling path of the vehicle based on the present position received from the GNSS position detection unit 2, a signal received from a gyroscope sensor (GYRO SENS) 8, a speed signal received from a speed pulse output unit (SPEED OUT) 9. The map matching unit 4 specifies the present position of the vehicle on a map based on map data received from the map data storage unit 5, the speed and azimuth of the vehicle received from the dead reckoning unit 3, and the present position of the vehicle received from the GNSS position detection unit 2. Hereinafter, the present position of the vehicle on the map is also referred to as a map present position.

The forward road information providing unit 6 is provided by a microcomputer, which includes a central processing unit (CPU), a random access memory (RAM), and a flash memory. The forward road information providing unit 6 performs a predetermined operation by executing a program stored in the flash memory. The forward road information providing unit 6 obtains information of forward roads from the map data with respect to the present position by executing a forward road information obtaining process. Hereinafter, the information of the forward roads is also referred to as forward road information. Specifically, the forward road information providing unit 6 obtains the forward road information based on the map data stored in the map data storage unit 5, the map present position, the speed and the azimuth of the vehicle received from the dead reckoning unit 3. The forward road information obtaining process with respect to the present position will be described later in detail. The forward road information obtained by the forward road information providing unit 6 is transmitted to an in-vehicle device, which needs the forward road information, via the CAN. For example, the in-vehicle device, which receives the forward road information from the forward road information providing unit 6, may be a drive support device (DRIVE SUPPORT) 10. Herein, the drive support device 10 is a device placed in the vehicle to provide a drive support service to a driver of the vehicle. The drive support device 10 may be provided by an advanced driver assistance system (ADAS) that provides advanced driver assistance services. The drive support device 10 is coupled to one or more other in-vehicle devices (IN-VEHICLE DEVICE) 11 including a display device and the like. The display device may be provided by a liquid crystal display.

Figure 2:
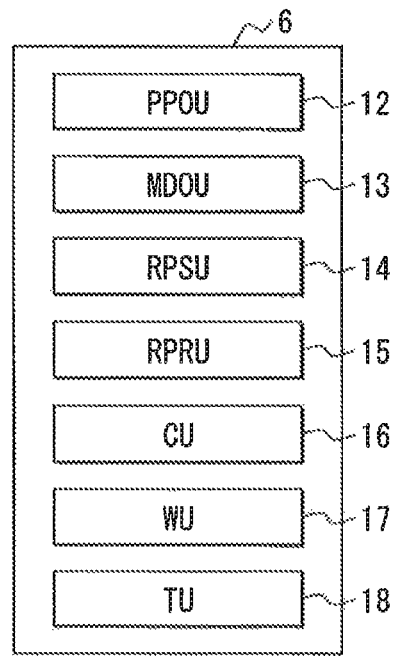
FIG. 2 is a block diagram showing a functional configuration of a forward road information providing unit of the road information providing apparatus.

As shown in FIG. 2, the forward road information providing unit 6 includes a present position obtaining unit (PPOU) 12, a map data obtaining unit (MDOU) 13, a reference point setting unit (RPSU) 14, a reference point ranking unit (RPRU) 15, a calculation unit (CU) 16, a weighting unit (WU) 17, and a transmit unit (TU) 18. The present position obtaining unit 12 obtains the present position, the azimuth and the speed of the vehicle based on signals received from the dead reckoning unit 3 and the map matching unit 4. Herein, the present position obtained by the present position obtaining unit 12 includes a latitude and a longitude of the present position and the map present position. The map data obtaining unit 13 obtains map data around the present position from the map data storage unit 5.

The reference point setting unit 14 calculates a subject position of the vehicle based on the map present position, and sets the subject position as a reference point of the forward road information. Herein, the subject position is a position included in a reference road link, and corresponds to the present position. The reference road link is a road link in which the map present position of the vehicle is included. When there are more than one candidates of the subject position, the reference point setting unit 14 sets the candidates as the reference points. A method of calculating the reference points executed by the reference point setting unit 14 will be described later in detail. In the above case, a calculation scope of the subject position is within a scope of the map data obtained by the map data obtaining unit 13. For example, the scope of the map data obtained by the map data obtaining unit 13 may include roads within one kilometer radius of the map present position of the vehicle.

The reference point ranking unit 15 defines rankings of the reference points when more than one reference points are calculated. A method of defining the rankings of the reference points will be described later in detail. The calculation unit 16 calculates a priority value (P) of each road link included in the forward roads with respect to each reference point, and the weighting unit 17 calculates a weighted priority value (WP)

of the each road link based on the ranking of each reference point. A priority value setting process will be described later in detail. The transmit unit 18 ranks the road links based on the priority value, and transmits the forward road information, which includes the ranking information of the road links, to the drive support device 10. A transmit process of the forward road information executed by the transmit unit 18 will be described later in detail.

Figure 3:
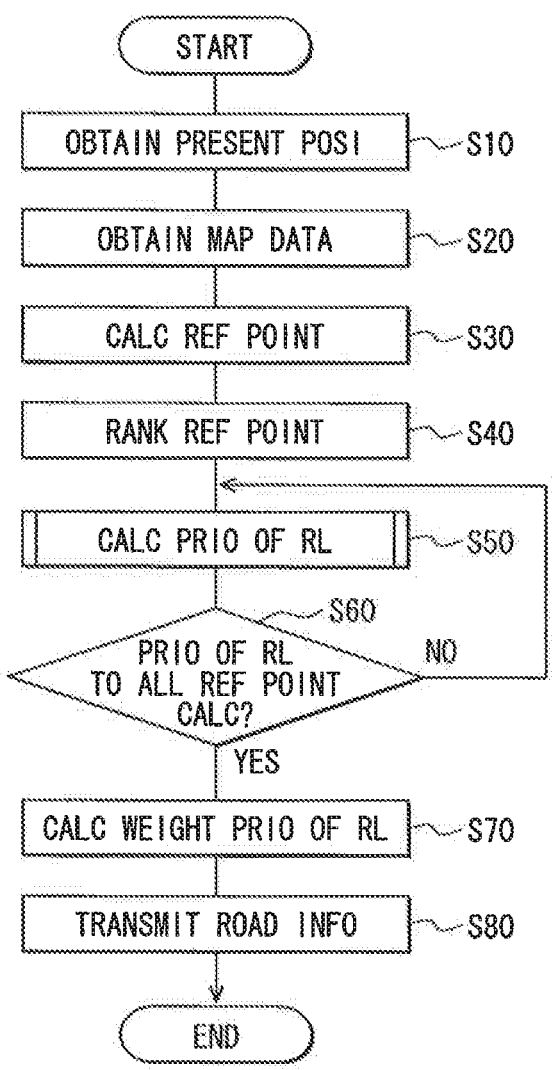
FIG. 3 is a flowchart showing a main process to provide road information executed by the forward road information providing unit.

The following will describe the forward road information obtaining process, which is also referred to as a main process hereinafter, with reference to FIG. 3 to FIG. 16. FIG. 3 is a flowchart showing the main process executed by the forward road information providing unit 6. At S10, the present position obtaining unit 12 obtains present position information of the vehicle. Herein, the present position information includes the latitude and the longitude of the present position, the map present position, and the present traveling path of the vehicle. At S20, the map data obtaining unit 13 obtains the map data, which includes information of a map of a predetermined area around the present position, from the map data storage unit 5. The map data includes road data including information of road links and road nodes. The predetermined area may be set as an area within one kilometer radius of the present position of the vehicle.

Figure 4A:
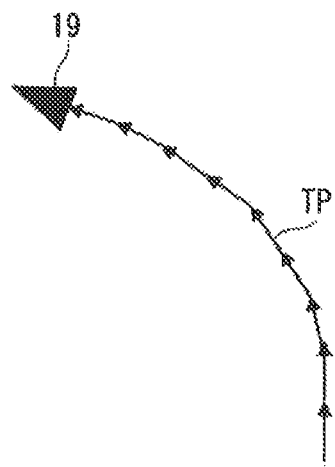
FIG. 4A and FIG. 4B are diagrams showing a method of setting reference points.
Figure 4B:
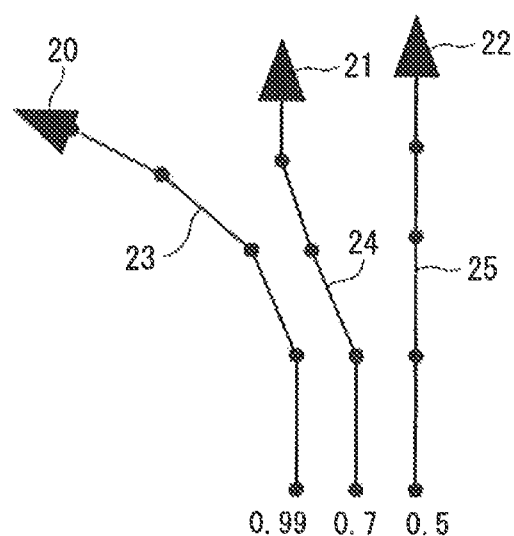

At S30, the reference point setting unit 14 calculates the reference points (REF POINT) based on the candidates of the subject position. That is, the reference point setting unit 14 calculates the candidates of the subject position, and sets the candidates as the reference points. As shown in FIG. 4A, the reference point setting unit 14 obtains the present traveling path TP of the vehicle. A forward end of the present traveling path TP is the present position 19 of the vehicle. The present position indicates a physically actual position of the vehicle, and the subject position indicates a corresponding position of the vehicle in the reference road link. It is presumed that three candidates 20, 21, 22 of the subject position are obtained with respect to the present position 19 of the vehicle as shown in FIG. 4B. Further, the three candidates 20, 21, 22 respectively correspond to road shapes 23, 24, 25. In this case, similarity degrees of each road shape 23, 24, 25 with the present traveling path TP is calculated. When the road shape 23, 24, 25 is more similar to the present traveling path TR the similarity degree has a higher value. As shown in FIG. 4B, the similarity degree of the road shape 23 is 0.99, the similarity degree of the road shape 24 is 0.7, and the similarity degree of the road shape 25 is 0.5. Herein, the similarity degree indicates a similarity relationship of each road shape 23, 24, 25 and the present traveling path TP. The number of the reference points may be one, two, three or more than three. The number of the reference points is likely to increase with the number of the junctions that connected to parallel road links to the reference road link.

At S40, the reference point ranking unit 15 defines the ranking of each reference point 20, 21, 22 based on the similarity degree of a corresponding road shape 23, 24, 25. The following will describe the method of defining the ranking of each reference point. The highest rank, which is rank one, is set to the reference point having the highest similarity degree with the present traveling path TP. Specifically, the ranking of each reference point defined by the reference point ranking unit 15 is that the reference point 20 is the first, the reference point 21 is the second, and the reference point 22 is the third. That is the reference point ranking unit 15 defines the ranking of the reference point 20, which corresponds to the most similar road shape 23 to the present traveling path TP, as one, and defines the ranking of the reference point 21, which corresponds to the second most similar road shape 24 to the present traveling path TP, as two, and defines the ranking of the reference point 22, which corresponds to the third similar road shape 25 to the present traveling path TP, as three.

At S50, the calculation unit 16 executes the priority value setting process with respect to each reference point. In the priority value setting process, the calculation unit 16 calculates priority values of road links corresponding to one of the reference points. In the present embodiment, the following calculation rules are defined for calculating the priority values of the road links with respect to each reference point.

Figure 5:
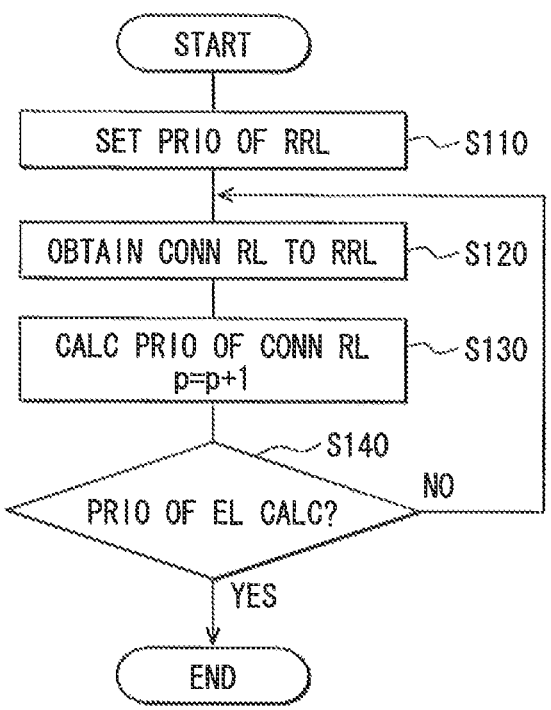
FIG. 5 is a flowchart showing a priority value setting process.
Figure 6:
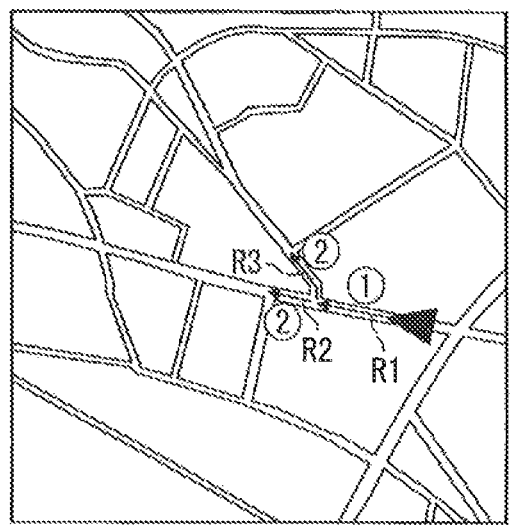
FIG. 6 is a diagram showing an example of setting priority values to forward road links.

A first rule prioritizes a forward road link from the subject position to a nearest junction and a forward road link from the nearest junction to a next junction. FIG. 5 shows a flowchart of the priority value setting process according to the first rule. As shown in FIG. 5 and FIG. 6, at S110, the calculation unit 16 sets a priority value of a forward road link R1 corresponding to the reference point as one. Herein, since the subject position is included in the forward road link R1, the forward road link R1 is the reference road link (RRL). The priority value P of the forward road link R1 is P=1. Then, at S120, the calculation unit 16 obtains information of forward road links R2, R3 that are connected to the reference road link R1. At S130, the calculation unit 16 sets a priority value of the forward road link R2 as two, and also sets a priority value of the forward road link R3 as two. That is, the priority value P of the forward road link R2 is P=P+1=2, and the priority value P of the forward road link R3 is P=P+1=2. In the present embodiment, the priority value having a smaller value corresponds to a higher priority. For example, a road link having a priority value of one has the highest priority.

At S140, the calculation unit 16 determines whether the priority value of an end link (EL) connected to an end junction within the predetermined area is calculated. When the calculation unit 16 determines that the priority value of the end link is not calculated (S140: NO), the calculation unit 16 returns to S120. When the calculation unit 16 determines that the priority value of the end link is calculated (S140: YES), the priority value setting process ends. FIG. 6 shows the partially calculated priority values of the forward road links.

A second rule prioritizes a forward road link having a short distance from the subject position. Specifically, the second rule prioritizes forward road links whose straight-line distances from the subject position are within a predetermined range. In this case, the predetermined range may be a fixed range or a variable range, which is variably set based on a running speed of the vehicle and a speed limitation of the forward road link. Further, among the forward road links whose straight-line distances from the subject position are within the predetermined range, the second rule prioritizes a forward road link whose road-running distance from the subject position of the vehicle is short. Herein, the road running distance is a distance running along the road. In this case, priority values of the forward road links having the same road-running distance may be further determined based on the straight-line distance. For example, when two road links have the same road-running distance, the road link having a longer straight-line distance may have a higher priority. That is, the road link having the longer straight-line distance is set to have a smaller priority value, which corresponds to a higher priority.

Figure 7:
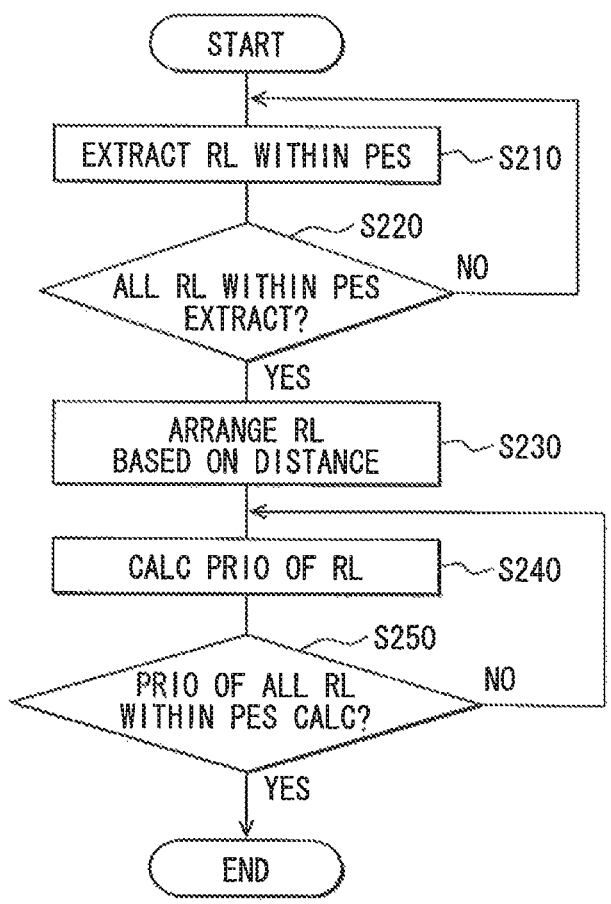
FIG. 7 is a flowchart showing a priority value setting process.
Figure 8:
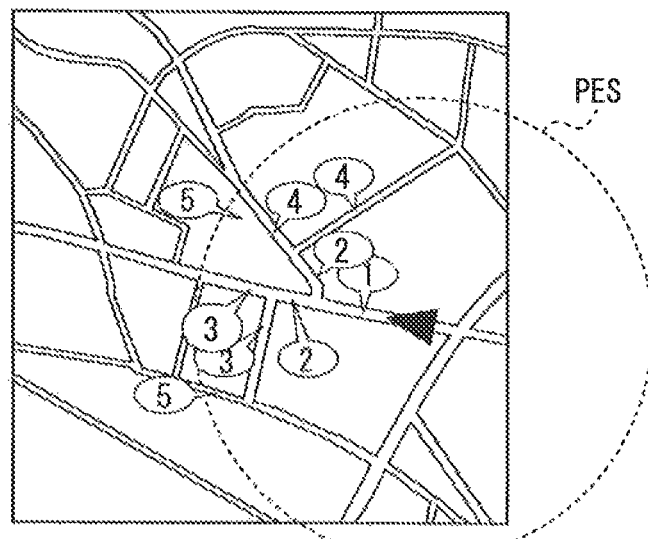
FIG. 8 is a diagram showing an example of setting priority values to forward road links.

The following will describe the priority value setting process according to the second rule with reference to FIG. 7 and FIG. 8. As shown in FIG. 7, at S210, the calculation unit 16 extracts the forward road links included in the predetermined range, which is also referred to as a predetermined extraction scope (PES). Herein, the predetermined extraction scope may be set as the calculation scope of the subject position. In this case, when all of the shape points of a forward road link are included in the extraction scope, the forward road link is determined to be included in the predetermined extraction scope. At S220, the calculation unit 16 determines whether all of the forward road links included in the predetermined extraction scope are extracted. When the calculation unit 16 determines that some forward road links included in the extraction scope are not extracted (S220: NO), the calculation unit 16 returns to S210.

At S220, when the calculation unit 16 determines that all of the forward road links included in the predetermined extraction scope are extracted (S220: YES), the calculation unit 16 proceeds to S230. At S230, the calculation unit 16 arranges the forward road links in order of increasing road-running distance from the subject position. In this case, the calculation unit 16 arranges the forward road links in order of increasing road-running distance from the subject position to a nearest shape point of the forward road link. At S240, the calculation unit 16 calculates priority values the forward road links in order of increasing road-running distance from the subject position. At S250, the calculation unit 16 determines whether all of the forward road links included in the predetermined extraction scope have the priority values. When the calculation unit 16 determines that some of the forward road links do not have priority values (S250: NO), the calculation unit 16 returns to S240.

When the calculation unit 16 determines that all of the forward road links have the priority values (S250: YES), the priority value setting process ends. FIG. 8 shows an example of setting the priority values of the forward road links according to the second rule.

A third rule prioritizes a forward road link with consideration of a rank of the forward road link. Specifically, the third rule prioritizes a forward road link having a high rank. For example, highways and national roads, which are also known as routes, have high ranks. Thus, highways and national roads are prioritized according to the third rule. Herein, highways, which include controlled-access highways and free-access highways, are roads designed for high-speed vehicular traffic. The rank of the forward road link is also referred to as a road link rank hereinafter. Further, the third rule prioritizes a forward road link having the same or similar rank with the reference road link in which the subject position is included. The priority values of the forward road links may be dynamically changed based on the speed of the vehicle. For example, when the speed of the vehicle is lower than a speed limitation of the reference road link, a forward road link having a lower rank may be prioritized considering that the vehicle may enter the forward road link having the lower rank. Further, when the speed of the vehicle is close to the speed limitation of the reference road link, a forward road link having the same or similar rank may be prioritized considering that the vehicle may enter the forward road link having the same or similar rank.

Figure 9:
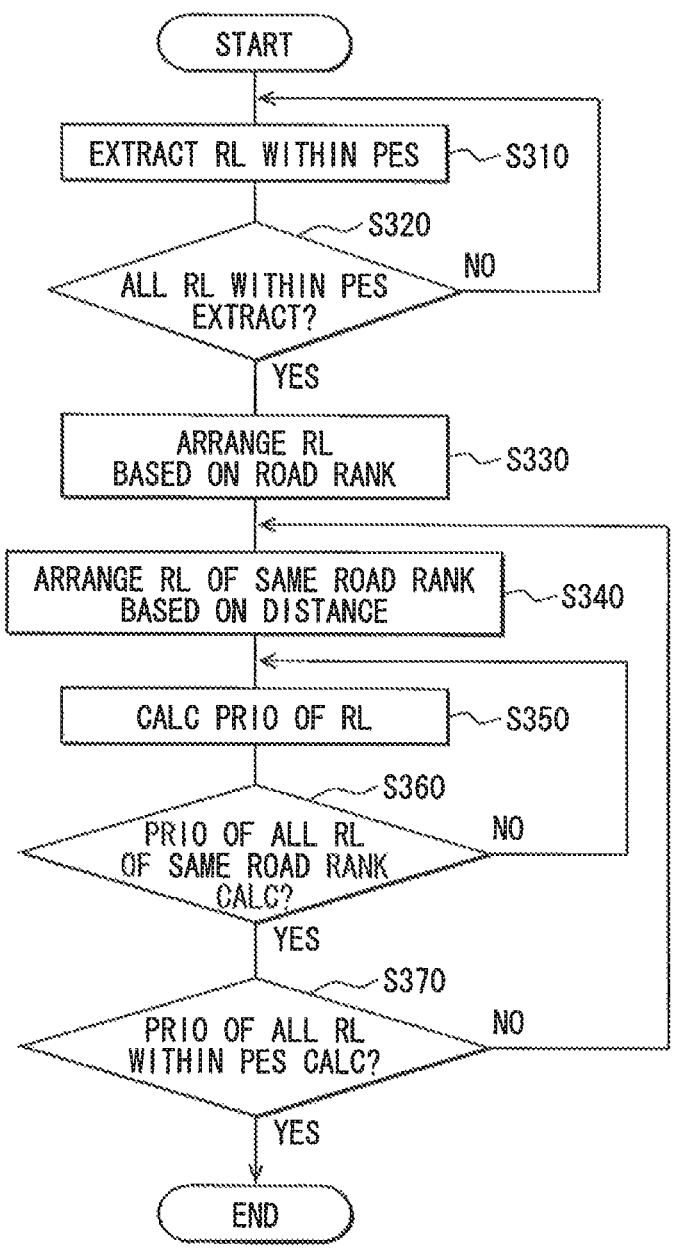
FIG. 9 is a flowchart showing a priority value setting process.
Figure 10:
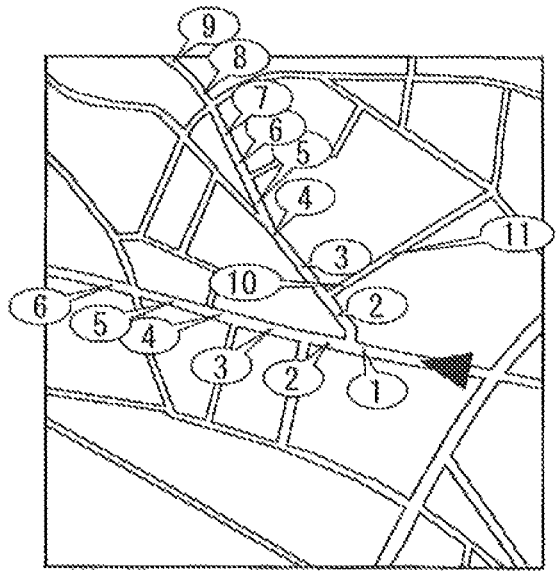
FIG. 10 is a diagram showing an example of setting priority values to forward road links.

The following will describe the priority value setting process according to the third rule with reference to FIG. 9 and FIG. 10. As shown in FIG. 9, at S310, the calculation unit 16 extracts forward road links included in the predetermined extraction scope (PES). In this case, when all of the shape points of a forward road link are included in the predetermined extraction scope, the forward road link is determined to be included in the predetermined extraction scope. At S320, the calculation unit 16 determines whether all of the forward road links included in the predetermined extraction scope are extracted. When the calculation unit 16 determines that some forward road links included in the predetermined extraction scope are not extracted (S320: NO), the calculation unit 16 returns to S310.

At S320, when the calculation unit 16 determines that all of the forward road links included in the predetermined extraction scope are extracted (S320: YES), the calculation unit 16 proceeds to S330. At S330, the calculation unit 16 arranges the forward road links in order of decreasing road link rank. In this case, the calculation unit 16 arranges the forward road links having the highest road link ranks in order of increasing road-running distance from the subject position. At S350, the calculation unit 16 sets priority values of the forward road links in order of increasing road-running distance from the subject position. At S360, the calculation unit 16 determines whether all of the forward road links, which are included in the predetermined extraction scope and have the highest road link ranks, have the priority values. When the calculation unit 16 determines that some forward road links, which are included in the predetermined extraction scope and have the highest road link ranks, have no priority values (S360: NO), the calculation unit 16 returns to S350.

When the calculation unit 16 determines that all of the forward road links, which are included in the predetermined extraction scope and have the highest road link ranks, have priority values (S360: YES), the calculation unit 16 proceeds to S370. At S370, the calculation unit 16 determines whether all of the forward road links included in the predetermined extraction scope have the priority values. When the calculation unit 16 determines that some forward road links included in the predetermined extraction scope have no priority values (S370: NO), the calculation unit 16 returns to S340. At S340, the calculation unit 16 arranges forward road links having the second highest road link ranks in order of increasing road-running distance from the subject position. When the calculation unit 16 determines that all of the forward road links included in the predetermined extraction scope have priority values (S370: YES), the priority value setting process ends. FIG. 10 shows an example of setting the priority values of the forward road links according to the third rule.

Figure 11:
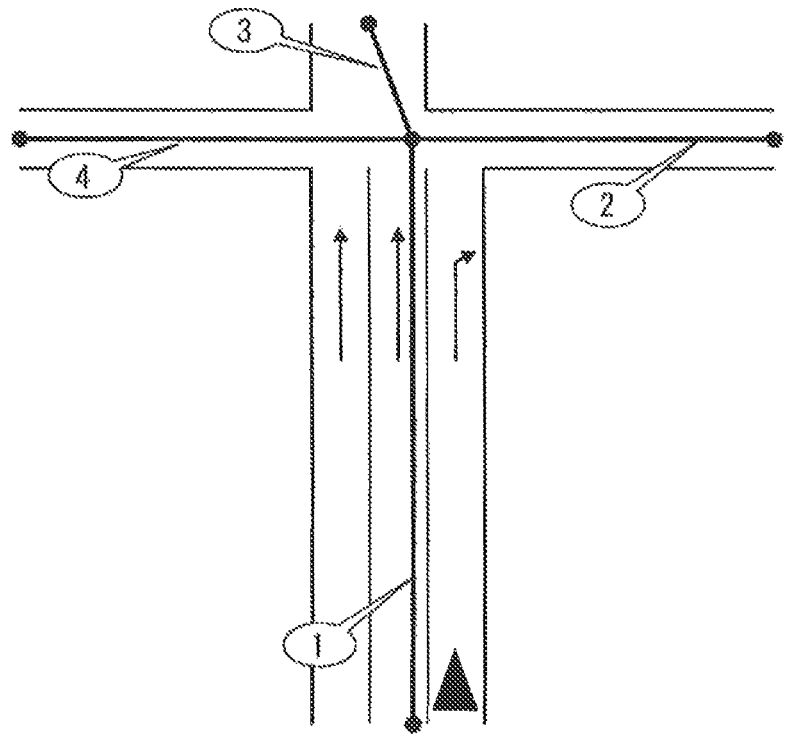
FIG. 11 is a diagram showing an example of setting priority values to forward road links with consideration of traffic lanes.

A fourth rule prioritizes a forward road link with consideration of a traffic lane. Specifically, the calculation unit 16 prioritizes the forward road link based on the traffic lane of the reference road link. For example, when the vehicle runs along a left-turn-only lane or a right-turn-only lane of the reference road link having more than one traffic lanes, the calculation unit 16 prioritizes the corresponding forward road link to which the vehicle to turn. FIG. 11 shows an example of setting the priority values of the forward road links according to the fourth rule.

A fifth rule is that a repeated transmission of information of the same forward road link is canceled. Specifically, when a forward road link is included in a loop, which is one part of the route to be used by the vehicle, the calculation unit 16 transmits information of the forward road link, to the drive support device 10, such that the forward road information is not repeated. Specifically, the calculation unit 16 identifies each forward road link included in the loop by setting a link identification (LINK ID), and cancels a repeated transmission of information of the same forward road link. Specifically, the calculation unit 16 skips overwriting a present priority value of the repeated forward road link present priority value of the forward road link with a repeatedly calculated new priority value. Herein, the present priority value is smaller than the new priority value.

Figure 12:
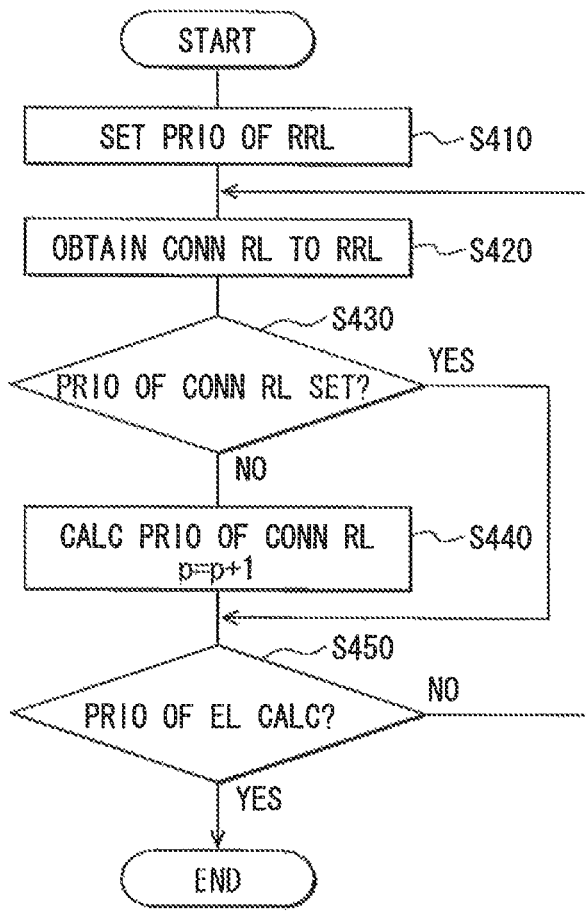
FIG. 12 is a flowchart showing a priority value setting process.
Figure 13:
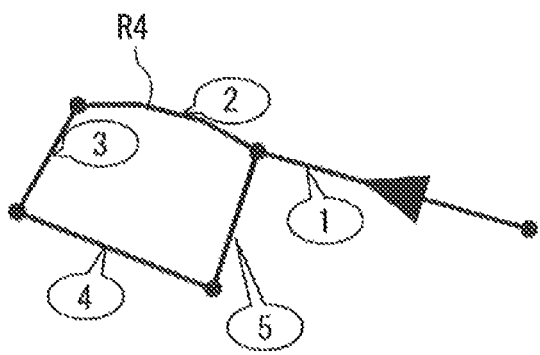
FIG. 13 is a diagram showing an example of setting priority values to forward road links.

The following will describe the priority value setting process according to the fifth rule with reference to FIG. 12 and FIG. 13. As shown in FIG. 12, at S410, the calculation unit 16 sets a priority value of the reference road link as level. That is, the calculation unit 16 sets the priority value P of the reference road link as P=1.

At S420, the calculation unit 16 repeatedly obtains a forward road link, which is connected to the reference road link.

At S430, the calculation unit 16 determines whether the forward road link connected to the reference road link has been set to have the priority value. When the calculation unit 16 determines that the forward road link connected to the reference road link has not been set to have the priority value (S430: NO), the calculation unit 16 sets the priority value of the forward road link connected to the reference road link at S440. Specifically, the calculation unit 16 sets the priority value of the forward road link connected to the reference road link as P=P 1. At S430, when the calculation unit 16 determines that the forward road link connected to the reference road link has been set to have the priority value (S430: YES), the calculation unit 16 skips repeatedly setting a new priority value, which is greater than the present priority value, to the forward road link connected to the reference road link, and proceeds to S450.

At S450, the calculation unit 16 determines whether the priority value of the end link connected to the end junction within the predetermined area is calculated. When the calculation unit 16 determines that the priority value of the end link is not calculated (S450: NO), the calculation unit 16 returns to S420. When the calculation unit 16 determines that the priority value of the end link is calculated (S450: YES), the priority value setting process ends. FIG. 13 shows an example of setting the priority values of the forward road links according to the fifth rule. In FIG. 13, to the road link R4, which has been set to have the priority value as two (P=2), the calculation unit 16 skips to set the new priority value as six (P=6).

A sixth rule is that traveling path records of the vehicle are used when the calculation unit 16 sets the priority values of the forward road links. A requirement of the sixth rule is that the traveling path records need to be previously stored and provided to the road information providing apparatus 1. Under a condition that the road information providing apparatus 1 previously stores the traveling path records, the calculation unit 16 extracts a forward road link having a higher frequency of use than a predetermined level from the traveling path records, and prioritizes the forward road link having the higher frequency of use. Further, the calculation unit 16 may refer to traveling path records of other vehicles, which are previously stored and provided to the road information providing apparatus 1. Specifically, the calculation unit 16 extracts a forward road link having the higher frequency of use from the traveling path records of other vehicles, and prioritizes the forward road link having the higher frequency of use. The previous traveling path records of other vehicles may be provided to the road information providing apparatus 1 via a data communication or via an external storage media. Further, the calculation unit 16 may refer to both the traveling path records of the vehicle and the traveling path records of other vehicles, and prioritizes a forward road link having the higher frequency of use.

As shown in FIG. 3, after the above-described priority value setting process, the calculation unit 16 determines whether the priority values of all of the reference points are calculated at S60. When the calculation unit 16 determines that some reference points have no priority values (S60: NO), the main process returns to S50.

At S60, when the calculation unit 16 determines that all of the reference points have the priority values (S60: YES), the main process proceeds to S70. At S70, the weighting unit 17 calculates priority values of the road links with consideration of the rankings of the reference points. Specifically, as shown in FIG. 14, the weighting unit 17 defines a coefficient (C) for each reference point to recalculate the priority values of the forward road links with consideration of the ranking of the corresponding reference point. For example, the weighting unit 17 sets the coefficient of the reference point, which has the ranking (R) one, as one. Similarly, the weighting unit 17 sets the coefficient of the reference point, which has the ranking two, as five. Similarly, the weighting unit 17 sets the coefficient of the reference point, which has the ranking three, as ten.

As shown in FIG. 15A to FIG. 15C, a priority value (P) of a forward road link with consideration of the ranking of the corresponding reference point is a multiplication of the priority value of the forward road link and the coefficient of the corresponding reference point. Hereinafter, the priority value of the forward road link with consideration of the ranking of the corresponding reference point is also referred to as a weighted priority value (WP). Specifically, as shown in FIG. 15A, the priority values of the forward road links 10001, 10002, 10003 are respectively set as 1, 2, 3, and the coefficient of the corresponding reference point to the forward road links 10001, 10002, 10003 is one. Herein, 10001, 10002, 10003 are link identifications (LINK ID). In this case, the weighted priority values of the forward road links 10001, 10002, 10003 are respectively 1, 2, 3. Further, as shown in FIG. 15B, the priority values of the forward road links 20001, 20002, 20003 are respectively set as 1, 2, 3, and the coefficient of the corresponding reference point to the forward road links 20001, 20002, 20003 is two. In this case, the weighted priority values of the forward road links 20001, 20002, 20003 are respectively 5, 10, 15.

Further, as shown in FIG. 15C, the priority values of the forward road links 30001, 30002, 30003 are respectively set as 1, 2, 3, and the coefficient of the corresponding reference point to the forward road links 30001, 30002, 30003 is three. In this case, the weighted priority values of the forward road links 30001, 30002, 30003 are respectively 10, 20, 30. Herein, the number of the forward road links is described as three with respect to each reference point as an example. In fact, the number of the forward road links is defined by the actual forward road links, and is not limited to three.

After calculating the weighted priority values of the forward road links, the weighting unit 17 arranges all of the forward road links in order of increasing priority value with consideration of the ranking of the reference point as shown in FIG. 16. That is, the weighting unit 17 ranks all of the forward road links in order of increasing weighted priority value. As described above, the priority value having smaller value corresponds to a higher priority. Thus, in FIG. 16, the forward road link having the priority value one has the highest priority.

As shown in FIG. 3, the transmit unit 18 transmits information of the ranked forward road links as the forward road information to the drive support device 10 in order of increasing weighted priority value at S80. That is, the transmit unit 18 transmits the forward road links shown in a table of FIG. 18 in order of decreasing priority. Thus, information of the forward road link having the highest priority is transmitted to the drive support device 10 at first.

In the present embodiment, the road information providing apparatus 1 maintains a communication load with the drive support device 10 as a predetermined level by dynamically switching the above-described six calculation rules based on a traffic density around the present position of the vehicle. That is, the road information providing apparatus 1 controls the data amount of the forward road information to be transmitted to the drive support device 10 so that the data amount of the forward road information, which is necessary for the drive support device 10, is reduced.

In the present embodiment, when the number of the reference points is more than one, the rankings of the reference points are defined. Then, weighted priority values of the forward road links, which consider the rankings of the reference points, are recalculated based on the previously calculated priority values of the forward road links. Then, the transmit unit 18 transmits the weighted priority values of the forward road links in order of increasing weighted priority value to the drive support device. With this configuration, the data amount of the forward road information to be transmitted to the drive support device 10 is reduced.

In the present embodiment, when calculating the priority values of the forward road links with respect to each reference point, the forward road link from the subject position to the nearest junction and the forward road link from the nearest junction to the next junction are prioritized. With this configuration, the information of the forward road links, which have higher possibilities to be used by the vehicle, is transmitted to the drive support device 10 even when the data amount of the road information is reduced.

In the present embodiment, the forward road links included in the predetermined area with respect to the present position of the vehicle are prioritized. Thus, the information of the forward road links, which have higher possibilities to be used by the vehicle, is transmitted to the drive support device 10. Further, forward road links having high road link ranks are prioritized when calculating the priority values of the forward road links. Thus, the information of the forward road links, which have higher possibilities to be used by the vehicle, is transmitted to the drive support device 10.

In the present embodiment, the forward road links ahead of the present traffic lane along which the vehicle runs is prioritized. Thus, the information of the forward road links, which have higher possibilities to be used by the vehicle, is transmitted to the drive support device 10. Further, when a loop is included in the route to be used by the vehicle, the forward road link included in the loop is canceled to be set to the new priority value, which is larger than the present priority value. Thus, the data amount of the forward road information is reduced and the information of the forward road links, which have higher possibilities to be used by the vehicle, is transmitted to the drive support device 10.

In the present embodiment, a forward road link having the higher frequency of use is extracted from the traveling path records of the vehicle to which the road information providing apparatus 1 is equipped or the traveling path records of other vehicles. The forward road link having the higher frequency of use is prioritized when calculating the priority values of the forward road links. Thus, the information of the forward road links, which have higher possibilities to be used by the vehicle, is transmitted to the drive support device 10.

In the present embodiment, the above-described six rules are used to calculate the priority values of the forward road links. Further, the following seventh rule may also be used to calculate the priority values of the forward road links. The following will describe the seventh rule of calculating the priority values of the forward road links as a modified embodiment of the present disclosure.

The seventh rule is that circumstances of a surrounding area are considered when the calculation unit 16 calculates the priority values of the forward road links. That is, a characteristic of the surrounding area of the present position is considered when calculating the priority values of the forward road links. In this case, the calculation scope of the priority values is classified into four areas including a first area, a second area, a third area and a fourth area based on a limited speed within a predetermined distance of a forward road included in a corresponding area and the number of the junctions included in the predetermined distance of the forward road included in the corresponding area. The priority values of the forward road links included in different areas are calculated in different methods.

As shown in FIG. 17, the first area includes a road, which has a high limited speed and has small number of junctions. For example, the first area includes a highway 26. In the first area, when the vehicle runs along the highway 26, the highway 26 is set to have a high priority and forward local roads are limited.

Specifically, the priority values of the forward local roads are set to high just for a predetermined distance. For example, when the vehicle runs along the highway 26, a priority value of a forward local road is set to have the high priority for only the first 500 meters or only a distance from the present position to a next junction.

As shown in FIG. 18, the second area includes a road, which has a high limited speed and has medium number of junctions. For example, the second area includes a suburban road. In the second area, when the vehicle runs along a leftmost traffic lane of the reference road link, a forward road link of the leftmost traffic lane is set to have a high priority. For example, when the vehicle runs along the leftmost traffic lane, a forward road link placed on the left side is set to have the high priority for a distance of 500 meters while a forward road placed on the right side is set to have the high priority for a distance of 300 meters.

As shown in FIG. 19, the third area includes a road, which has a medium limited speed and has large number of junctions. For example, the third area includes an urban road. In the third area, when the vehicle runs along a leftmost traffic lane of the reference road link, a forward road link corresponding to the leftmost traffic lane is set to have a high priority. For example, when the vehicle runs along the leftmost traffic lane, a forward road placed on the left side is set to have the high priority from the subject position to the second junction while a forward road placed on the right side is set to have the high priority from the subject position to the first junction.

As shown in FIG. 20, the fourth area includes a road, which has a low limited speed and has large number of junctions. For example, the fourth area includes a road positioned in a residential zone, in the fourth area, a surrounding road included within, for example, one kilometer radius of the present position of the vehicle other than the forward road is set to have a higher priority than the forward road.

In the present embodiment, the road information providing apparatus 1 transmits the forward road information to the drive support device 10. Further, the road information providing apparatus 1 may directly transmit the forward road information to an in-vehicle device, such as a display device, instead of the drive support device 10.

In the present embodiment, the number of the reference points is set as three as an example. Further, the number of the reference points is defined based on the candidates of the present position. Thus, the number of the reference points may be two, four or more than four. When the number of the reference points is one, the ranking process of the reference points and the recalculation of the weighted priority values may be skipped.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A road information providing apparatus comprising:
a position detection unit that detects a present position which indicates a physical position of a vehicle to which the road information providing apparatus is equipped;
a matching unit that:
compares the present position of the vehicle with a map data, the map data including information of a map of a predetermined area;
specifies a plurality of candidates which each correspond to a different road shape, each of the plurality of candidates includes a subject position, the plurality of candidates are specified based on the present position and are extracted from the map data, the subject position (i) is a position that exists on the map of the predetermined area, (ii) corresponds to the present position of the vehicle, and (iii) is included in a road link of the map of the predetermined area; and
sets the candidates of the subject position as a plurality of reference points, each of the reference points corresponding to a plurality of forward road links;
a reference point ranking unit that defines a ranking of each of the reference points;
a calculation unit that calculates a priority value of each of the forward road links;
a weighting unit that recalculates a weighted priority value of each of the forward road links based on the priority value of corresponding one of the forward road links and the ranking of corresponding one of the reference points; and
a transmit unit that transmits the weighted priority value of each of the forward road links in order of increasing weighted priority value to an in-vehicle device.

2. The road information providing apparatus according to claim 1,
wherein one of the reference points is referred to as a subject reference point, and the forward road links corresponding to the subject reference point are referred to as subject forward road links, and
wherein the calculation unit prioritizes one of the subject forward road links from the subject position to a nearest junction and another one of the subject forward road links from the nearest junction to a next junction when the calculation unit calculates the priority value of each of the subject forward road links.

3. The road information providing apparatus according to claim 1,
wherein one of the reference points is referred to as a subject reference point, and the forward road links corresponding to the subject reference point are referred to as subject forward road links, and
wherein the calculation unit prioritizes one of the subject forward road links included within a predetermined distance from the subject position when the calculation unit calculates the priority value of each of the subject forward road links.

4. The road information providing apparatus according to claim 1,
wherein one of the reference points is referred to as a subject reference point, and the forward road links corresponding to the subject reference point are referred to as subject forward road links, and
wherein the calculation unit prioritizes one of the subject forward road links that has a higher road link rank than a predetermined rank when the calculation unit calculates the priority value of each of the subject forward road links.

5. The road information providing apparatus according to claim 1,
wherein one of the reference points is referred to as a subject reference point, and the forward road links corresponding to the subject reference point are referred to as subject forward road links, and
wherein the calculation unit prioritizes one of the subject forward road links connected to a present traffic lane along which the vehicle runs when the calculation unit calculates the priority value of each of the subject forward road links.

6. The road information providing apparatus according to claim 1,
wherein one of the reference points is referred to as a subject reference point, and the forward road links corresponding to the subject reference point are referred to as subject forward road links, and
wherein, when one of the subject forward road links is included in a loop, the calculation unit skips overwriting a present priority value of the one of the subject forward road links, which is lower than a repeatedly calculated priority value, with the repeatedly calculated priority value.

7. The road information providing apparatus according to claim 1,
wherein one of the reference points is referred to as a subject reference point, and the forward road links corresponding to the subject reference point are referred to as subject forward road links, and
wherein the calculation unit:
extracts one of the subject forward road links, which has a higher frequency of use than a predetermined level, based on a plurality of traveling path records of the vehicle or a plurality of traveling path records of other vehicles; and
prioritizes the one of the subject forward road links, which has the higher frequency of use, when the calculation unit calculates the priority value of each of the subject forward road links.

8. The road information providing apparatus according to claim 1,
wherein one of the reference points is referred to as a subject reference point, and the forward road links corresponding to the subject reference point are referred to as subject forward road links, and
wherein the calculation unit calculates the priority value of each of the subject forward road links with consideration of a characteristic of a surrounding area of the subject position.

9. The road information providing apparatus according to claim 1,
wherein when the reference point ranking unit defines the ranking of each of the reference points, the reference point ranking unit compares a present traveling path of the vehicle with a plurality of road shapes respectively corresponding to the reference points, and
wherein the reference point ranking unit calculates a similarity degree of the present traveling path with each of the road shapes, and defines the ranking of each of the reference points in order of decreasing similarity degree.

10. The road information providing apparatus according to claim 9,
   wherein the similarity degree indicates a similarity relationship between the present traveling path and each of the road shapes, and
   wherein, when one of the road shapes is more similar to the present traveling path, the similarity degree of the one of the road shapes has a higher value.

11. The road information providing apparatus according to claim 1,
   wherein the weighting unit defines a coefficient of each of the reference points based on the ranking of each of the reference points, and
   wherein the weighting unit recalculates the weighted priority value of each of the forward road links by multiplying the priority value of the corresponding one of the forward road links by the coefficient of the corresponding one of the reference points.

* * * * *